United States Patent
Jeong et al.

(10) Patent No.: US 9,794,914 B2
(45) Date of Patent: *Oct. 17, 2017

(54) RACH-RELATED SYSTEM RESOURCE OPTIMIZATION METHOD AND APPARATUS FOR WIRELESS COMMUNICATION SYSTEM

(71) Applicant: Samsung Electronics Co., Ltd., Gyeonggi-do (KR)

(72) Inventors: Kyeong In Jeong, Gyeonggi-do (KR); Gert-Jan Van Lieshout, Zwolle (NL)

(73) Assignee: Samsung Electronics Co., Ltd (KR)

( * ) Notice: Subject to any disclaimer, the term of this patent is extended or adjusted under 35 U.S.C. 154(b) by 354 days.

This patent is subject to a terminal disclaimer.

(21) Appl. No.: 14/524,683

(22) Filed: Oct. 27, 2014

(65) Prior Publication Data
US 2015/0043512 A1   Feb. 12, 2015

Related U.S. Application Data

(63) Continuation of application No. 12/728,636, filed on Mar. 22, 2010, now Pat. No. 8,873,406.

(30) Foreign Application Priority Data

Mar. 20, 2009  (KR) .................. 10-2009-0024139

(51) Int. Cl.
*H04W 72/04* (2009.01)
*H04W 52/26* (2009.01)
(Continued)

(52) U.S. Cl.
CPC ....... *H04W 72/0413* (2013.01); *H04W 28/06* (2013.01); *H04W 52/267* (2013.01);
(Continued)

(58) Field of Classification Search
None
See application file for complete search history.

(56) References Cited

U.S. PATENT DOCUMENTS 7,266,106 B2   9/2007  Nylander et al.
7,302,276 B2 * 11/2007  Bernhardsson ....... H04W 52/14
                                                    455/226.1
(Continued)

FOREIGN PATENT DOCUMENTS

WO   WO 2008/115452   9/2008

OTHER PUBLICATIONS

Samsung, NTT DoCoMo, Pathloss & Size in RACH Signature, R2-071171, 3GPP TSG-RAN2 Meeting #57, Feb. 12-16, 2007.
(Continued)

*Primary Examiner* — Candal Elpenord
(74) *Attorney, Agent, or Firm* — The Farrell Law Firm, P.C.

(57) ABSTRACT

A method and an apparatus are provided for receiving information by a terminal in a wireless communication system. The method includes transmitting, to a base station, a request message including a preamble; receiving, from the base station, a response message including uplink resource information determined based on the preamble; determining at least one of downlink channel information and uplink transmission capability corresponding to a specific uplink transmission; and transmitting, if an information request message is received from the base station, the at least one of the downlink channel information and the uplink transmission capability to the base station.

16 Claims, 7 Drawing Sheets

(51) Int. Cl.
*H04W 74/08* (2009.01)
*H04W 28/06* (2009.01)
*H04W 74/00* (2009.01)

(52) U.S. Cl.
CPC ..... *H04W 72/048* (2013.01); *H04W 74/0833* (2013.01); *H04W 74/002* (2013.01)

(56) References Cited

U.S. PATENT DOCUMENTS

| | | |
|---|---|---|
| 7,672,365 B2 | 3/2010 | Jacobsen et al. |
| 7,898,948 B2 | 3/2011 | DiGirolamo et al. |
| 8,098,644 B2 | 1/2012 | Xiao et al. |
| 8,102,878 B2 | 1/2012 | Lee |
| 8,116,262 B2 | 2/2012 | Zhang et al. |
| 8,233,427 B2 | 7/2012 | Reial et al. |
| 8,514,779 B2 | 8/2013 | Ozturk et al. |
| 8,644,292 B2 | 2/2014 | Gorokhov et al. |
| 2002/0147022 A1 | 10/2002 | Subramanian et al. |
| 2004/0156328 A1 | 8/2004 | Walton et al. |
| 2005/0068916 A1 | 3/2005 | Jacobsen et al. |
| 2005/0213682 A1 | 9/2005 | Han et al. |
| 2006/0133322 A1 | 6/2006 | Vannithamby et al. |
| 2006/0229091 A1 | 10/2006 | Rezaiifar et al. |
| 2007/0121547 A1 | 5/2007 | Huh et al. |
| 2007/0184871 A1 | 8/2007 | Morita |
| 2007/0291719 A1* | 12/2007 | Demirhan ........... H04W 74/008 370/338 |
| 2008/0019306 A1 | 1/2008 | Damnjanovic |
| 2008/0069031 A1 | 3/2008 | Zhang et al. |
| 2008/0096563 A1 | 4/2008 | Fischer et al. |
| 2008/0113684 A1 | 5/2008 | Jung et al. |
| 2008/0130588 A1 | 6/2008 | Jeong et al. |
| 2008/0188260 A1 | 8/2008 | Xiao et al. |
| 2008/0225744 A1 | 9/2008 | DiGirolamo et al. |
| 2008/0242308 A1 | 10/2008 | Gunnarsson et al. |
| 2008/0273610 A1* | 11/2008 | Malladi ................ H04L 1/0029 375/260 |
| 2009/0168718 A1* | 7/2009 | Wang .................... H04L 1/0026 370/330 |
| 2009/0176525 A1* | 7/2009 | Wang .................. H04W 52/146 455/522 |
| 2009/0323607 A1* | 12/2009 | Park ..................... H04B 7/2628 370/329 |
| 2010/0265900 A1 | 10/2010 | Baldemair et al. |
| 2011/0090806 A1 | 4/2011 | Ozturk et al. |

OTHER PUBLICATIONS

Korean Office Action dated May 20, 2015 issued in counterpart application No. 10-2009-0024139.

* cited by examiner

RACH-RELATED SYSTEM RESOURCE OPTIMIZATION METHOD AND APPARATUS FOR WIRELESS COMMUNICATION SYSTEM

PRIORITY

This application is continuation of U.S. application Ser. No. 12/728,636, which was filed in the U.S. Patent and Trademark Office on Mar. 22, 2010, and claims priority under 35 U.S.C. §119(a) to Korean Application No. 10-2009-0024139, which was filed in the Korean Intellectual Property Office on Mar. 20, 2009, the entire content of each of which is incorporated herein by reference.

BACKGROUND OF THE INVENTION

1. Field of the Invention

The present invention relates generally to wireless communications and, more particularly, to a Random Access CHannel (RACH)-related system resource optimization method and apparatus in a wireless communication system.

2. Description of the Related Art

Long Term Evolution (LTE), which is a project to improve the Universal Mobile Telecommunication Standard (UMTS), is a next generation high-speed wireless communication technology based on Orthogonal Frequency Division Multiplexing (OFDM).

FIG. 1 is a diagram illustrating an LTE system architecture.

As shown in FIG. 1, the LTE mobile communication is characterized with Evolved Radio Access Networks (E-RANs) 110 and 112 having only two infrastructure nodes: Evolved Node B's (ENBs) 120, 122, 124, 126, and 128 and anchor nodes 130 and 132. A User Equipment (UE) 101 accesses an Internet Protocol (IP) network 114 via E-RANs 110 and 112. The ENBs 120, 122, 124, 126, and 128 are responsible for wireless channel establishment for the UE 101 and management of the cells and wireless resources. For example, the ENBs 120, 122, 124, 126, and 128 broadcast system information, allocate a radio resource for transmission of data and control information to the UE 101, and determine a handover of the UE 101 based on the channel management information collected from the current cell and its neighbor cells. The ENBs 120, 122, 124, 126, and 128 are provided with a control protocol such as a Radio Resource Control (RRC) protocol related to the radio resource management.

FIG. 2 is a diagram illustrating an LTE system including a Self Optimized Network (SON) server.

In the LTE system of FIG. 1, the SON is the network which optimizes the parameters related to the system resources of a cell automatically. Specifically, the network optimizes the system resource-related parameters automatically based on the statistical values reported by a UE 201 and/or obtained through self-management operations without any network test by operator personnel. The UE 201 and an ENB 211 communicate data and control information through a radio interface. An SON server 221 receives the statistical values from the ENB 211 and determines policies suitable for the ENB 211 and the parameter values related to the system information of the cell. Some parameters related to the system resources can be optimized automatically within the ENB 211 without involvement of the SON server 221.

FIG. 3 is a signaling diagram illustrating RACH signaling between a UE and an ENB in a conventional LTE system. In FIG. 3, a UE 301 can access the RACH of an ENB 303 defining a specific cell. The UE 301 selects a preamble group and transmits a code sequence, specifically a random access preamble, selected from the preamble group to the ENB 302 on the predetermined RACH resource in step 311. How to select the preamble group follows the 3GPP standard TS36.321v8.4.0. Typically the preamble group is selected based on the current channel condition and the size of a message to be transmitted. If the random access preamble has been received, the ENB 303 transmits a random access response containing preamble ID information, Timing Advance (TA) information for adjusting uplink timing, uplink resource allocation information for transmitting a message, and Temporary Radio Network Temporary Identifier (T-RNTI) in step 321. The ENB 303 can allocate different uplink resource depending on the preamble group to which the random access preamble belongs. For example, if a parameter messageSizeGroupA having the value of b56 is broadcast as the system information, and if the received preamble belongs to the preamble group A, the uplink resource is allocated as much as 56 bits. Otherwise, if the received preamble belongs to the preamble group B, the uplink resource can be allocated as much as more than 56 bits.

If the random access response message has been received, the UE 301 transmits a scheduled transmission message to the ENB 303 using the uplink resource in step 331. At this time, if the preamble received at step 321 matches the preamble transmitted at the UE 301, the UE 301 transmits an L2/L3 message. When multiple UEs have transmitted the random access preambles simultaneously, the preambles can collide at step 311. In order to clearly acknowledge the receipt of the preamble, the ENB 303 transmits a contention resolution message containing a Serving Temporary Mobile Subscriber Identity (S-TMSI) or the random identity information to the UE 301 in step 341. Each of the UEs that transmitted the same preamble receives the contention resolution message and checks whether the S-TMSI or the random identity information contained in the contention resolution message is identical with that transmitted in the scheduled transmission message. If the received identity information matches the received identity information, the UE continues the RACH procedure. If the received identity information does not match the received identity information, the UE reinitiates the RACH procedure.

Table 1 shows the Medium Access Control (MAC) system parameters broadcast in association with the RACH procedure in the LTE system. Reference is made to the 3GPP standards TS36.331v8.4.0 and TS36.321v8.4.0 specifying the parameters listed in Table 1.

TABLE 1

| RACH-ConfigCommon | |
| --- | --- |
| preambleInfo | |
| > numberOfRA-Preambles | ENUM {n4, n8, n12, n16, n20, n24, n28, n32, n36, n40, n44, n48, n52, n56, n60, |
| > preamblesGroupAConfig | |
| >> sizeOfRA-PreamblesGroupA | ENUM {n4, n8, n12, n16, n20, n24, n28, n32, n36, n40, n44, n48, n52, n56, n60, |
| >> messageSizeGroupA | ENUM {b56, b144, b208, spare1} |
| >> messagePowerOffsetGroupB | ENUM {minusinfinity, spare1} |
| powerRampingParameters | |
| > powerRampingStep | ENUM {dB0, dB2, dB4, dB6} |

TABLE 1-continued

| RACH-ConfigCommon | |
|---|---|
| > preambleInitialReceivedTargetPower | ENUM {dBm-120, dBm-118, dBm-116, dBm-114, dBm-112, dBm-110, dBm-108, dBm-106, dBm-104, dBm-102, dBm-100, dBm-98, dBm-96, dBm-94, dBm-92, |
| ra-SupervisionInfo | |
| > preambleTransMax | ENUM {n3, n4, n5, n6, n7, n8, n10, n20, n50, n100, n200, spare5, spare4, spare3, spare2, spare1} |
| > ra-ResponseWindowSize | ENUM {sf2, sf3, sf4, sf5, sf6, sf7, sf8, sf10} |
| > mac-ContentionResolutionTimer | ENUM {sf8, sf16, sf24, sf32, sf40, sf48, sf56, sf64} |
| maxHARQ-Msg3Tx | INT (1 . . . 8) |

Among the RACH MAC parameters, messageSize-GroupA represents the transmission message size parameters as the references for selecting the preamble group. For example, if the mesageSizeGroupA is set to b56 and if the uplink message size is shorter than 56 bits, the preamble group A is selected.

SUMMARY OF THE INVENTION

The present invention has been made to address at least the above problems and/or disadvantages and to provide at least the advantages described below.

Accordingly, an aspect of the present invention provides a RACH-related system resource optimization method and apparatus that is capable of optimizing a message size parameter automatically in a wireless communication system.

According to one aspect of the present invention, a method is provided for receiving information by a terminal in a wireless communication system. The method includes transmitting, to a base station, a request message including a preamble; receiving, from the base station, a response message including uplink resource information determined based on the preamble; determining at least one of downlink channel information and an uplink transmission capability corresponding to a specific uplink transmission; and transmitting, if an information request message is received from the base station, the at least one of the downlink channel information and the uplink transmission capability to the base station.

According to another aspect of the present invention, a method is provided for transmitting information by a base station in a wireless communication system. The method includes receiving, from a terminal, a request message including a preamble; transmitting, to the terminal, a response message including uplink resource information determined based on the preamble; and receiving at least one of downlink channel information and an uplink transmission capability corresponding to a specific uplink transmission, determined by the terminal, if an information request message is transmitted to the terminal.

According to another aspect of the present invention, an apparatus of a terminal is provided for receiving information in a wireless communication system. The apparatus includes a transceiver; and a controller configured to transmit, to a base station, a request message including a preamble, to receive, from the base station, a response message including uplink resource information determined based on the preamble, to determine at least one of downlink channel information and an uplink transmission capability corresponding to a specific uplink transmission, and to transmit, to the base station, if an information request message is received from the base station, the at least one of the downlink channel information and the uplink transmission capability.

According to another aspect of the present invention, an apparatus of a base station is provided for transmitting information in a wireless communication system. The apparatus includes a transceiver; and a controller configured to receive, from a terminal, a request message including a preamble, to transmit, to the terminal, a response message including uplink resource information determined based on the preamble, and to receive at least one of a downlink channel information and an uplink transmission capability corresponding to a specific uplink transmission determined by the terminal, if an information request message is transmitted to the terminal.

BRIEF DESCRIPTION OF THE DRAWINGS

The above and other aspects, features and advantages of certain embodiments of the present invention will be more apparent from the following detailed description when taken in conjunction with the accompanying drawings, in which.

DETAILED DESCRIPTION OF EMBODIMENTS OF THE PRESENT INVENTION

Figure 1:
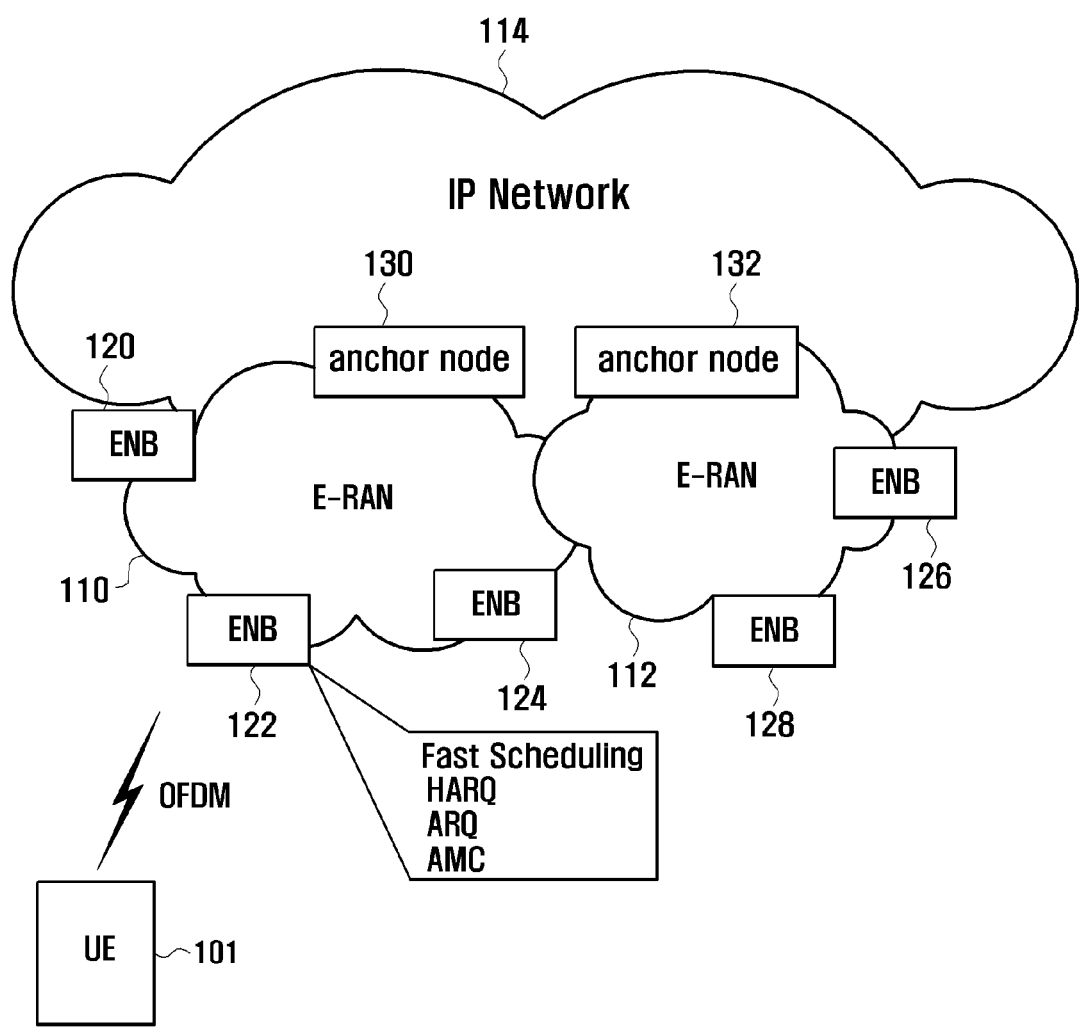
FIG. 1 is a diagram illustrating an LTE system architecture.
Figure 2:
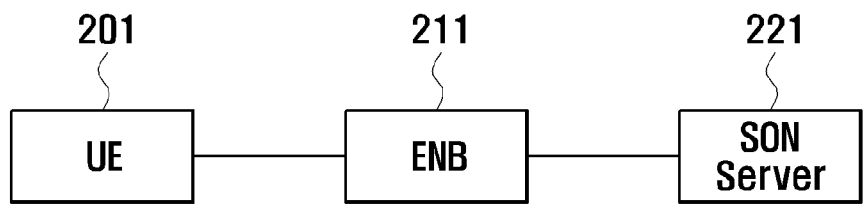
FIG. 2 is a diagram illustrating an LTE system including a Self Optimized Network (SON) server.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The embodiments of the present invention provide a RACH-related system resource optimization method in which the UE checks the downlink channel condition and transmission capability and reports the downlink channel condition and transmission capability to the ENB. The ENB or the SON server converts the channel condition and transmission capability reported periodically by the UE into a statistical value, compares the statistical value with a predetermined reference value, adjusts the message size parameter based on the comparison result, and notifies the UE of the adjusted message size parameter. The transmission capability can represent the power margin obtained by subtracting the transmission power for transmitting a scheduled transmission message according to the stored message size parameter from the power available for transmitting the scheduled transmission message for random access of the UE. Also, the transmission capability can represent a number of bits corresponding to the power available for transmitting the scheduled transmission message. The message size parameter is a parameter for determining the size of the scheduled transmission message at the UE. Although a description is made, in the following, under the assumption that the message size parameters are messageSizeGroupA and messagePowerOffsetGroupB, the present invention is not limited thereto.

Figure 3:
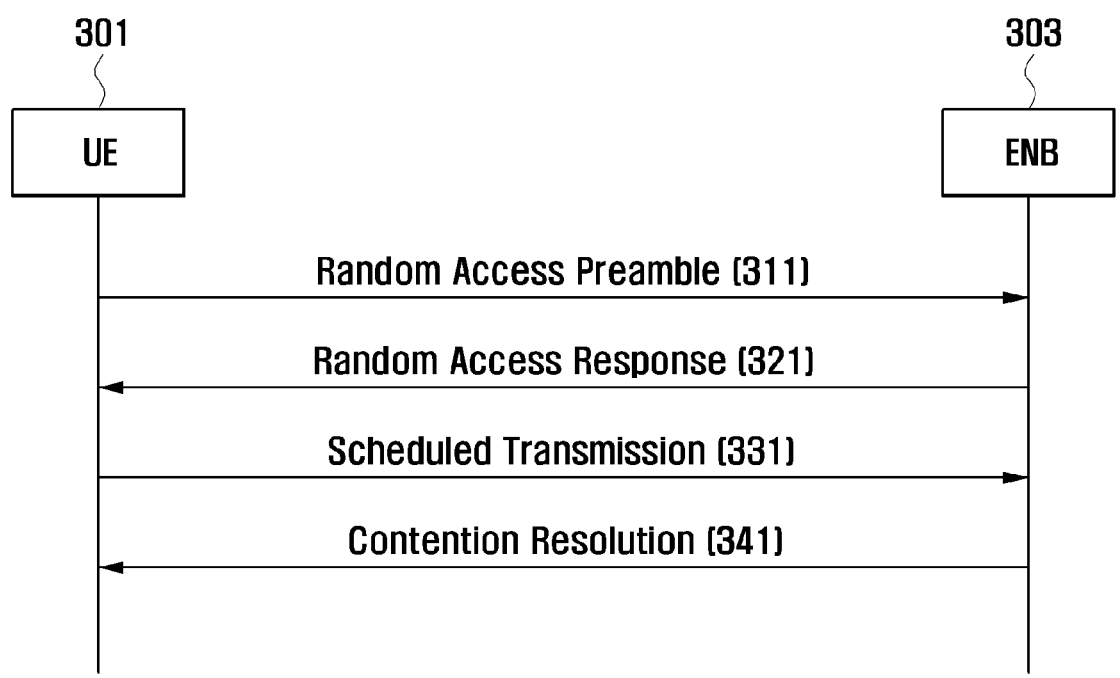
FIG. 3 is a signaling diagram illustrating RACH signaling between a UE and an ENB in a conventional LTE system.

In order to optimize the aforementioned parameters in the network (including the ENB and the SON server), the UE stores the downlink channel condition value in RACH procedure and the power margin value per Physical Cell ID or Global Cell ID in transmitting the scheduled transmission message (see FIG. 3), and reports these values to the network after the completion of the RACH procedure or in response to the request from the network. The downlink channel condition value can be a Downlink (DL) Pathloss or Open Loop Power Control (OLPC) result value, and the power margin value can be the value obtained by subtracting the power needed for transmitting the scheduled transmission message (see FIG. 3) from the total available uplink power. The network converts the values transmitted by the UEs to statistical values for a predetermined duration and optimizes the parameters messageSizeGroupA and messagePowerOffsetGroupB based on the statistical values.

For example, if the system is configured with the messageSizeGroupA set to b56 and the sum of residual powers, after most UEs located at the cell boundary region (inferred from the DL channel condition information) transmit the scheduled transmission messages with 56 bits, is enough to transmit 144 bits rather than 56 bits (inferred from the power margin information), the network resets the messageSizeGroupA value to b144 automatically. Otherwise, if the system is configured with the messageSizeGroupA set to b144 and the sum of residual powers, after most UEs located at the cell boundary region (inferred from the power margin information) transmit the scheduled transmission messages with 144 bits, is negative (−) (inferred from the power margin information), the network resets the messageSizeGroupA value to b56 automatically.

The ENB can perform configuration of the parameters by itself, or the ENB determines the parameter values based on the statistical value reported by the ENB and notifies the ENB of the determined parameter values.

In an embodiment of the present invention, the UEs located at the cell boundary and that selected the preamble group A (inferred from the pathloss measurement) record the values of information amounts (e.g. identifier for 56 bits, 144 bits, or 208 bits) per cell (Physical Cell ID or Global Cell ID) transmittable with the current available transmission power for transmitting their scheduled transmission messages. The UEs report the recorded values to the network after the completion of the RACH procedure or in response to the request from the network. The network converts the values reported by the UEs to the statistical values for a predetermined duration and optimizes the parameters messageSizeGroupA and messagePowerOffsetGroupB based on the statistical values.

For example, if the system is configured with the messageSizeGroupA set to b56 and it is determined that most UEs at the cell boundary have the transmission powers enough to transmit 144 bits based on the statistical values, the network resets the messageSizeGroupA to b144 automatically. Otherwise, if the system is configured with the messageSizeGroupA set to b144 and it is determined that most UEs at the cell boundary have the transmission powers only enough to transmit 56 bits, the network resets the messageSizeGroupA to b56 automatically.

Figure 4:
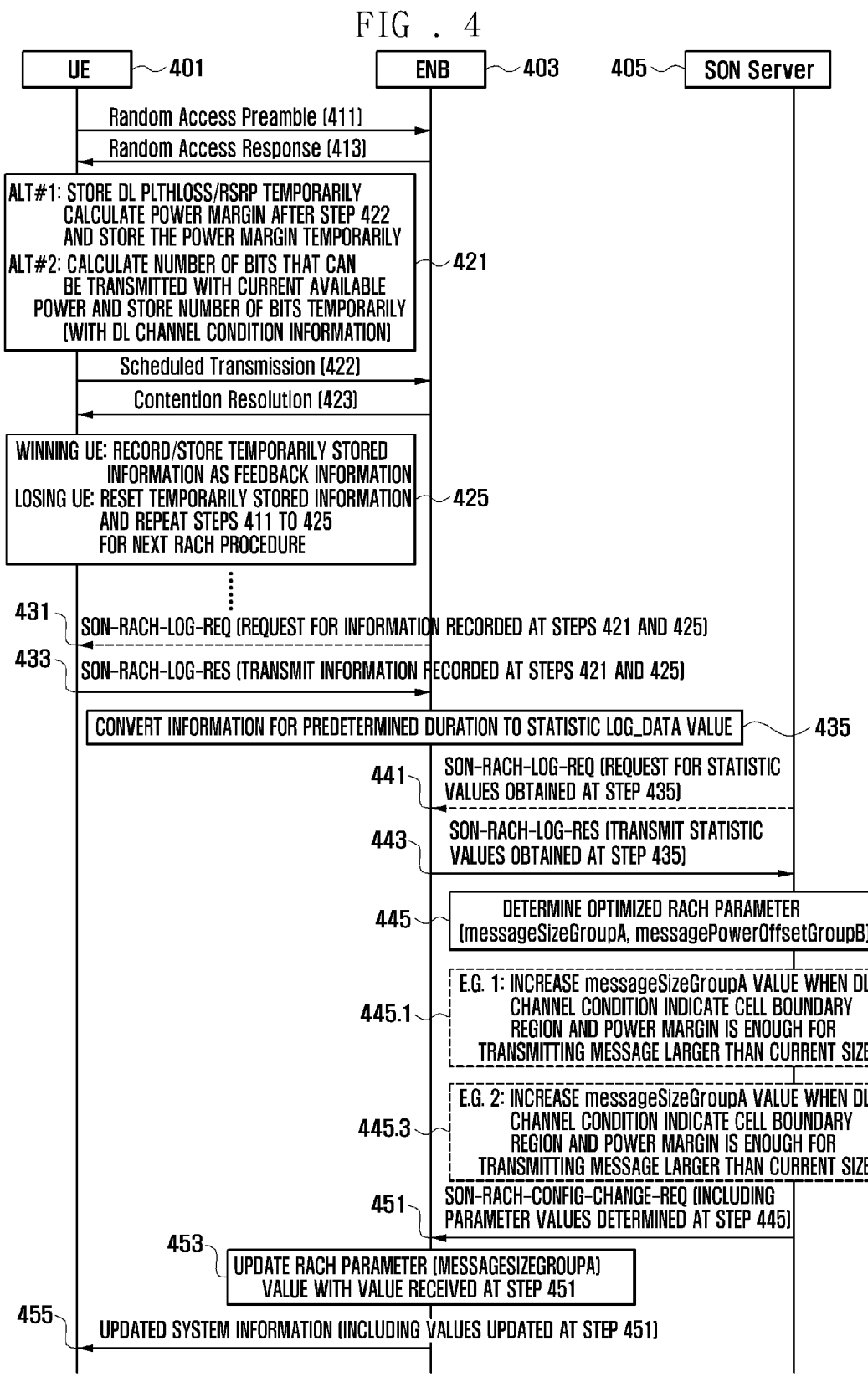
FIG. 4 is a sequence diagram illustrating operations of a UE, an ENB, and a server for optimizing the RACH-related resource in a wireless communication system, according to an embodiment of the present invention.

FIG. 4 is a sequence diagram illustrating operations of a UE, an ENB, and a server for optimizing the RACH-related resource in a wireless communication system, according to an embodiment of the present invention.

Referring to FIG. 4, a UE 401 transmits a preamble selected randomly within a selected preamble group to an ENB 403 in step 411. Upon receipt of the preamble, the ENB 403 transmits a response message containing preamble identity information, uplink timing compensation information, uplink resource allocation information for transmission of the next uplink message, and temporary UE identity information in step 413. Upon receipt of the response message, the UE 401 stores a power margin value (ALT#1) in step 421. The UE 401 can record a DL channel condition value before performing step 411. The DL channel condition value can include a pathloss measurement result value and a Reference Signal Received Power (RSRP) measurement result value. The RSRP is defined in the 3GPP TS36.214. The power margin value can be set to a value obtained by subtracting the transmission power of the scheduled transmission message from the total available power. The UE 401 transmits the scheduled transmission message to the ENB 403 on the uplink resource allocated by means of the response message in step 422. The scheduled transmission message can be an L2/L3 message. The UE 401 can calculate and store the power margin after step 422.

If the scheduled transmission message has been received, the ENB 403 transmits a contention resolution message containing the unique UE ID information (S-TMSI) or random ID information identical with that contained in the scheduled transmission message in step 423. If the contention resolution message contains unique UE ID information or the random ID information corresponding to that transmitted, the UE 401 (WINNING UE) records/stores the measured information along with the physical cell ID and/or global cell ID in step 425. If the unique UE ID information or the random ID information contained in the contention resolution message does not match the transmitted identity information, the UE 401 (LOSING UE) resets the stored information and repeats steps 411 to 425.

The ENB can request the UE 401 to provide the recoded/stored information by transmitting a SON-RACH-LOG-REQ message in step 431. Upon receipt of the SON-RACH-LOG-REQ message, the UE 401 transmits the stored information to the ENB 403 in step 433. In another embodiment of the present invention, the UE 401 can transmit the stored information when the RACH procedure has completed successfully, without request from the ENB 403. If the stored information has been received, the ENB 403 converts the information received from the UEs to statistical values in step 435 and transmits the statistical values to a SON server 405 in step 443. The statistical values can be transmitted in response to a statistical value request message received from the SON server 405 in step 441.

If the statistical values have been received, the SON server 405 determines the optimal values of the message size parameters, i.e., messageSizedGroupA and messagePower- OffsetGroupB, in step 445. For example, if the system is configured with the messageSizeGroupA set to b56 and the sum of residual powers, after most UEs located at the cell boundary region (inferred from the DL channel condition information) transmit the scheduled transmission messages with 56 bits, is enough to transmit 144 bits rather than 56 bits (inferred from the power margin information), the network resets the messageSizeGroupA value to b144 automatically in step 455.1. If the system is configured with the messageSizeGroupA set to b144 and the sum of residual powers, after most UEs located at the cell boundary region (inferred from the power margin information) transmit the scheduled transmission messages with 144 bits, is negative (-) (inferred from the power margin information), the network resets the messageSizeGroupA value to b56 automatically in step 445.3.

Once the optimal values of the parameters have been determined, the SON server 405 notifies the ENB 403 of the parameter values by means of a SON-RACH-CONFIG-CHANGE-REQ message in step 451. Upon receipt of the SON-RACH-CONFIG-CHANGE-REQ message, the ENB 403 updates the parameters with the received parameter values in step 453 and transmits the system information containing the updated parameters to the UEs within the cell in step 455.

In another embodiment of the present invention, the UEs located at the cell boundary and that selected the preamble group A (inferred from the pathloss measurement, i.e. the UEs selected the preamble group A according to the pathloss measurement result) record the values of information amount (e.g. indicator for 56 bits, 144 bits, or 208 bits) per cell (Physical Cell ID or Global Cell ID) transmittable with the current available transmission power for transmitting their scheduled transmission messages and report the recorded values to the network after the completion of the RACH procedure or in response to the request from the network. The network converts the values reported by the UEs to the statistical values for a predetermined duration and optimizes the parameters messageSizeGroupA and messagePowerOffsetGroupB based on the statistical values. For example, if the system is configured with the messageSizeGroupA set to b56 and it is determined that most UEs at the cell boundary have the transmission powers enough to transmit 144 bits based on the statistical values, the network resets the messageSizeGroupA to b144 automatically. If the system is configured with the messageSizeGroupA set to b144 and it is determined that most UEs at the cell boundary have the transmission powers only enough to transmit 56 bits, the network resets the messageSizeGroupA to b56 automatically. In an embodiment of the present invention, the UE 401 can temporarily store the maximum number of information bits (e.g., indicator for 56 bits, 144 bits, or 208 bits), rather than the DL channel condition measured at step 421 and the power margin value after the scheduled transmission at step 422, as the currently available power (ALT#2) at step 421.

Although a description is provided of a procedure in which the ENB 403 can generate the statistical values using the information transmitted by the UEs 401 and transmit the statistical values to the SON server 405 such that the SON server 405 determines the parameter values and notifies the ENB 403 of the parameter values, the ENB 403 may also perform all the operations related to the auto-configuration of the parameters.

Figure 5:
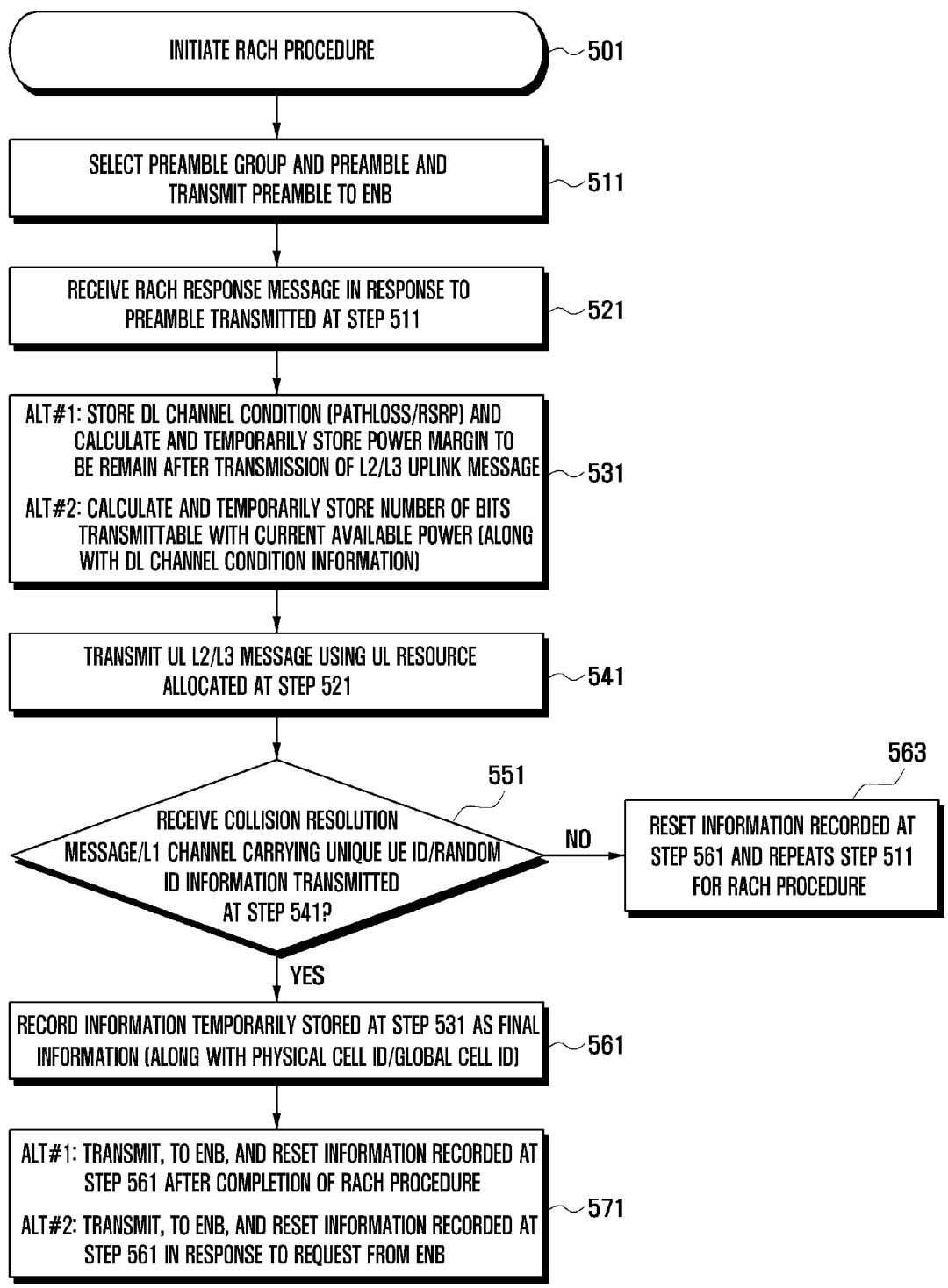
FIG. 5 is a flowchart illustrating operations of the UE for the RACH-related system resource optimization method, according to an embodiment of the present invention.

FIG. 5 is a flowchart illustrating operations of the UE for the RACH-related system resource optimization method, according to an embodiment of the present invention.

Referring to FIG. 5, the UE 401 initiates the RACH procedure in step 501. Once the RACH procedure is initiated, the UE 401 selects a preamble group based on the current downlink channel condition and the size of the uplink transmission L1/L2 message, and transmits a preamble which is randomly selected within the selected preamble group as specified in the 3GPP standard TS36.321 and TS36.331 in step 511. The UE 401 receives a RACH response message in response to the transmitted preamble in step 521. Upon receipt of the RACH response message, the UE 401 stores the DL channel condition (e.g., pathloss and/or RSRP measurement results) and calculates and stores the power margin after the transmission of a UL L2/L3 message (ALT#1) in step 531. The power margin can be calculated by subtracting the power needed to transmit the UL L2/L3 message with the current messageSizeGroupA setting from the total available UL transmission power. In another embodiment of the present invention, the UE 401 calculates the number of information bits transmittable with the current available power (e.g., indicator for 56 bits, 144 bits, or 208 bits) and stores the calculated value temporarily (ALT#2) in step 531.

The UE 401 transmits the UL L2/L3 message using the UL resource allocated by means of the RACH response message based on the current value of the messageSizeGroupA in step 541. The L2/L3 message includes the unique UE ID (Cell Radio Network Temporary Identifier (C-RNTI) or unique UE ID within Tracking Area (TA) (S-TMSI)). The UE 401 can calculate and store c after step 541.

Although the UE 401 stores the DL channel condition information after the receipt of the RACH response message in FIG. 5, it is possible to store the DL channel condition information before step 511 or step 521. In cases of ALT#1 and ALT#2, the operations of power margin calculation after transmission of L2/L3 uplink message (ALT#1) and calculating and storing the number of bits possible to be transmitted with the current available power (ALT#2) can be limited to the UEs located at the cell boundary region in order to reduce the storage amount of the information. Thus, only the UEs that selected the preamble group A as a consequence of the pathloss measurement perform steps 531, 561, 563, and 571 of FIG. 5. The UE 401 is not needed to store the current DL channel condition information of ALT#1 or ALT#2.

After transmitting the UL L2/L3 message, the UE 401 determines whether its unique UE ID (unique UE ID within cell (C-RNTI) and/or unique UE ID within Tracking Area (TA) (S-TMSI)) or random ID information is received in the contention resolution message or L1 channel (e.g. PDCCH) in step 551. If the UE ID is received in the contention resolution message or L1 channel, the UE 401 records the information temporarily stored at step 451 in step 561. The UE 401 can record the physical ID or the Cell Global ID (CGI) along with the temporarily stored information. The UE 401 transmits the recorded information to the ENB 403 in step 571. The UE 401 can transmit the information recorded at step 561 to the ENB 403 and resets the recorded information after the completion of the RACH procedure (ALT#1) or in response to the request of the ENB 403 (ALT#2). If the UE ID is not received in the contention resolution message or L1 channel, the UE 401 resets the information which is temporarily stored at step 531 and the procedure returns to step 511.

Figure 6:
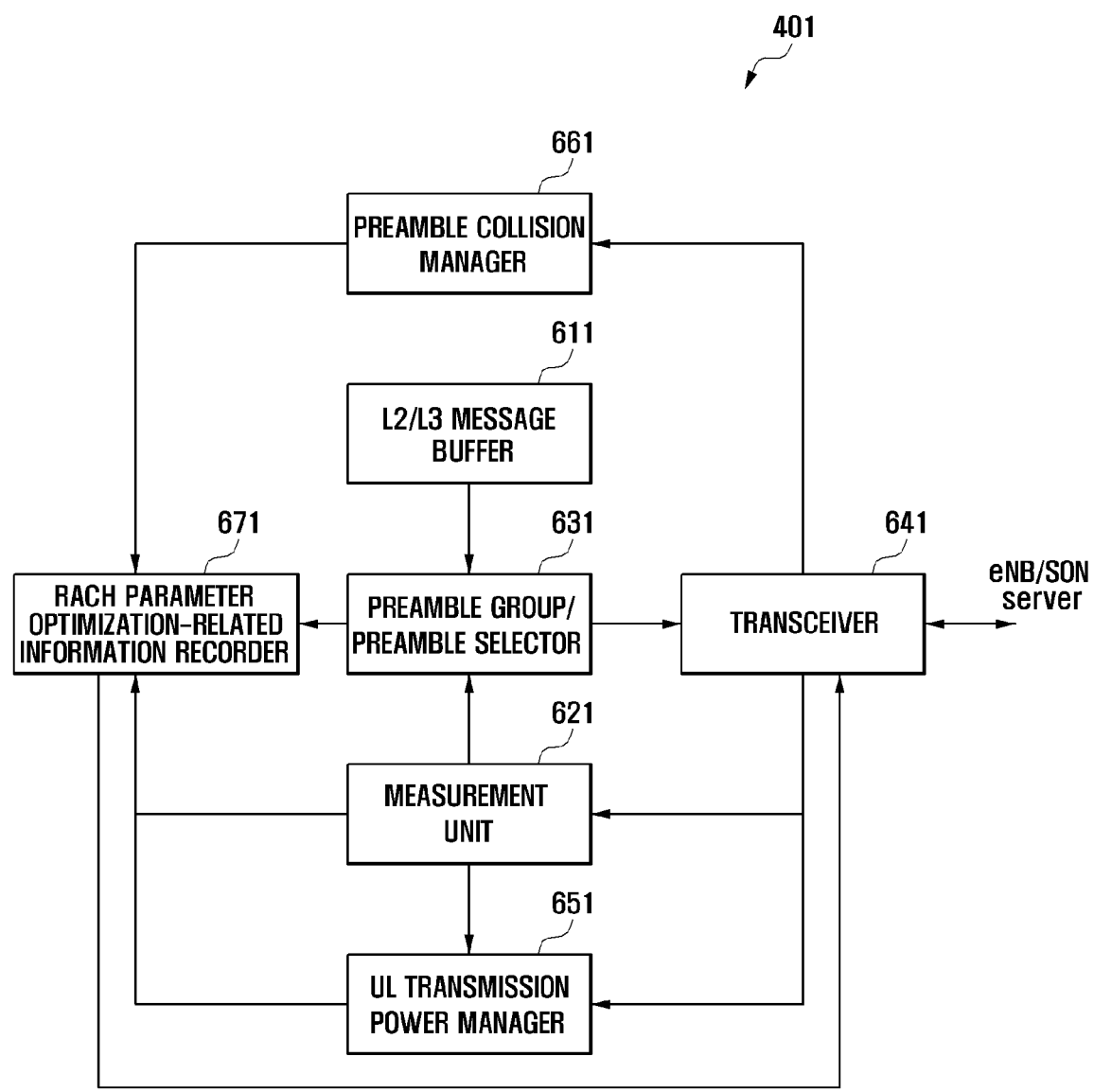
FIG. 6 is a block diagram illustrating a configuration of a UE for supporting the RACH-related system resource optimization method, according to an embodiment of the present invention.

FIG. 6 is a block diagram illustrating a configuration of a UE for supporting the RACH-related system resource optimization method, according to an embodiment of the present invention.

As shown in FIG. 6, the UE includes an L2/L3 message buffer 611, a measurement unit 621, a preamble group/preamble selector 631, a transceiver 641, a UL transmission power manager 651, a preamble collision manager 661, and a RACH parameter optimization-related information recorder 671.

The L2/L3 message buffer 611 buffers the L2/L3 message and provides the information on the size of the UL L2/L3 message. The measurement unit 621 measures the channel condition, such as, pathloss and RSRP. The preamble group/preamble selector 631 selects a preamble group and then randomly selects a preamble within the selected preamble group based on the information provided by the L2/L3 message buffer 611 and the measurement unit 621. The transceiver 641 transmits the selected preamble to the ENB 403.

If the RACH response message is received through the transceiver 641, the RACH parameter optimization-related information recorder 671 stores the information on the DL channel condition measured by the measurement unit 621 and the information on the power margin to be remained after transmission of the UL L2/L3 message before transmitting the UL L2/L3 message. In an embodiment of the present invention, the RACH parameter optimization-related information recorder 671 can store the information on the number of information bits that can be transmitted with the current available power provided by the UL transmission power manager 651. The preamble collision manager 661 interprets the collision resolution message or L1 scheduling information carried by the L 1 message (PDCCH) that are received by means of the transceiver 641. If it is determined that the UE 401 is the WINNING UE, the RACH parameter optimization-related information recorder 671 records the temporarily stored information as the finial feedback information. If it is determined that the UE 401 is the LOSING UE, the RACH parameter optimization-related information recorder 671 resets the temporarily stored information. The feedback information that is finally recorded by the RACH parameter optimization-related information recorder 671 can be transmitted to the ENB 403 by means of the transceiver 641 in response to the request from the network (i.e. ENB or SON server) or after the RACH procedure has been successfully completed.

Figure 7:
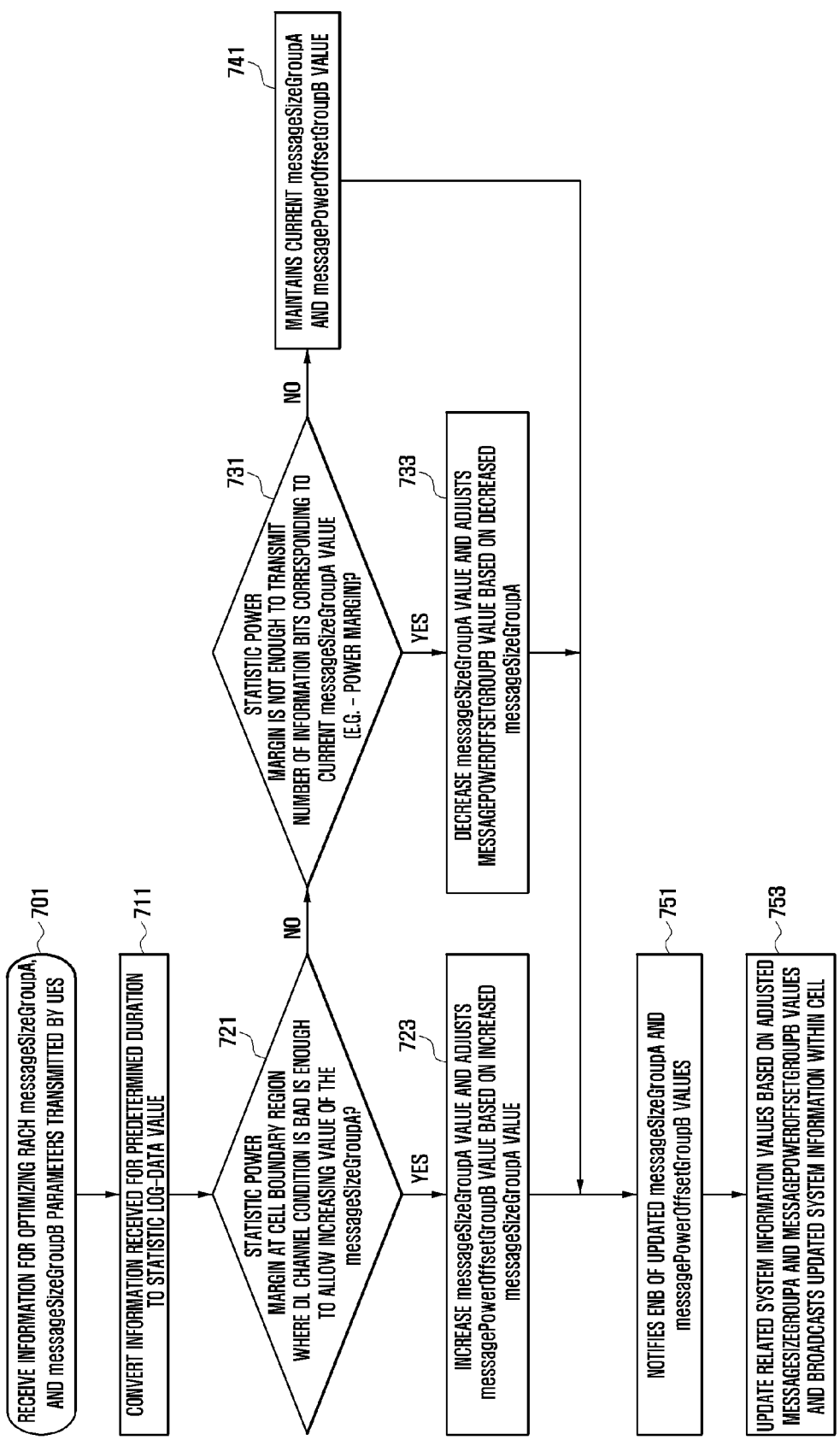
FIG. 7 is a flowchart illustrating operations of the network for the RACH-related system resource optimization method, according to an embodiment of the present invention.

FIG. 7 is a flowchart illustrating operations of the network for the RACH-related system resource optimization method, according to an embodiment of the present invention. The network can be represented by at least one of the ENB 403 and the SON server 405.

Referring to FIG. 7, the network collects the information required for optimizing the message size parameters (e.g., RACH messageSizeGroupA and messagePowerOffGroupB) from the UEs 401 in step 701. Once the information has been collected for a predetermined duration, the network converts the collected information to statistic LOG-DATA values in step 711.

The network determines whether the statistic power margin at the cell boundary region where the DL channel condition is bad is enough to allow increasing the value of the messageSizeGroupA in step 721. If the statistic power margin at the cell boundary region is enough to allow increasing the messageSizeGroupA value and the current messageSizeGroupA value is not the maximum value, the network increases the messageSizeGroupA value and adjusts the messagePowerOffsetGroupB value based on the increased messageSizeGroupA value in step 723. If the statistic power margin at the cell boundary region is not enough to allow increasing the messageSizeGroupA value (e.g., if the power margin is minus (−) value), the network determines whether the statistic power margin is not enough to transmit the number of information bits corresponding to the current messageSizeGroupA value in step 731. If the statistic power margin is not enough to transmit the number of information bits corresponding to the current messageSizeGroupA value (e.g., minus power margin) and the current messageSizeGroupA value is not the minimum value, the network decreases the messageSizeGroupA value and adjusts the messagePowerOffsetGroupB value based on the decreased messageSizeGroupA in step 733. If the statistic power margin is not enough to increase the messageSizeGroupA value at step 721 and to transmit the number of information bits corresponding to the current messageSizeGroupA value at step 731, the network maintains the current messageSizeGroupA value and messagePowerOffsetGroupB value in step 741.

The network notifies the ENB 403 of the messageSizeGroupA and messagePowerOffsetGroupB values updated at one of steps 723, 733, or 741 in step 751. Step 751 is needed when the SON server 405 performs steps 721, 723, 731, 733, and 741. If steps 701 to 741 are performed by the ENB, step 751 is not needed. The network updates the related system information values based on the adjusted (notified) messageSizeGroupA and messagePowerOffsetGroupB values and broadcasts the updated system information within the cell in step 753.

The operations of the network described with reference to FIG. 7 can be performed by different network nodes depending on the operator's policy. For example, steps 701 to 753 can be performed by the ENB 403 (in this case, step 751 is omitted) or steps 701 to 751 can be performed by the SON server 405 and step 753 can be performed by the ENB 403. Also, steps 701 to 711 and 753 can be performed by the ENB 403 and steps 721 to 751 can be performed by the SON server 405. In the last case, the statistic data LOG-DATA converted by the ENB at step 711 is transmitted to the SON server 405 before step 721. These and all other configurations are included in the embodiments of the present invention. When applying the embodiment of FIG. 4, the ENB 403 performs steps 701 to 711 and 753, and the SON server 405 performs steps 721 to 751.

Although not depicted in FIG. 7, if the information received from the UEs includes the number of information bits for transmitting the UL L2/L3 message using the current available power (e.g. indicator of 56 bits, 144 bits, or 208 bits) as in the above-described other embodiments, the network can adjust the messageSizeGroupA value based on the statistical value of the number of information bits and then the messagePowerOffsetGroupB value according to the adjusted messageSizeGroupA value. For example, if the current messageSizeGroupA is set to b56 and it is determined that many/most UEs can transmit 144 bits based on the statistical values, the network increases the messageSizeGroupA to 144b and adjusts the messagePowerOffsetB according to the increased messageSizeGroupA. In contrast, if the current messageSizeGroupA is set to b144 and it is determined that many/most UEs can transmit 56 bits based on the statistical values, the network decreases the messageSizeGroupA to 56b and adjusts the messagePowerOffsetB according to the decreased messageSizeGroupA.

Figure 8:
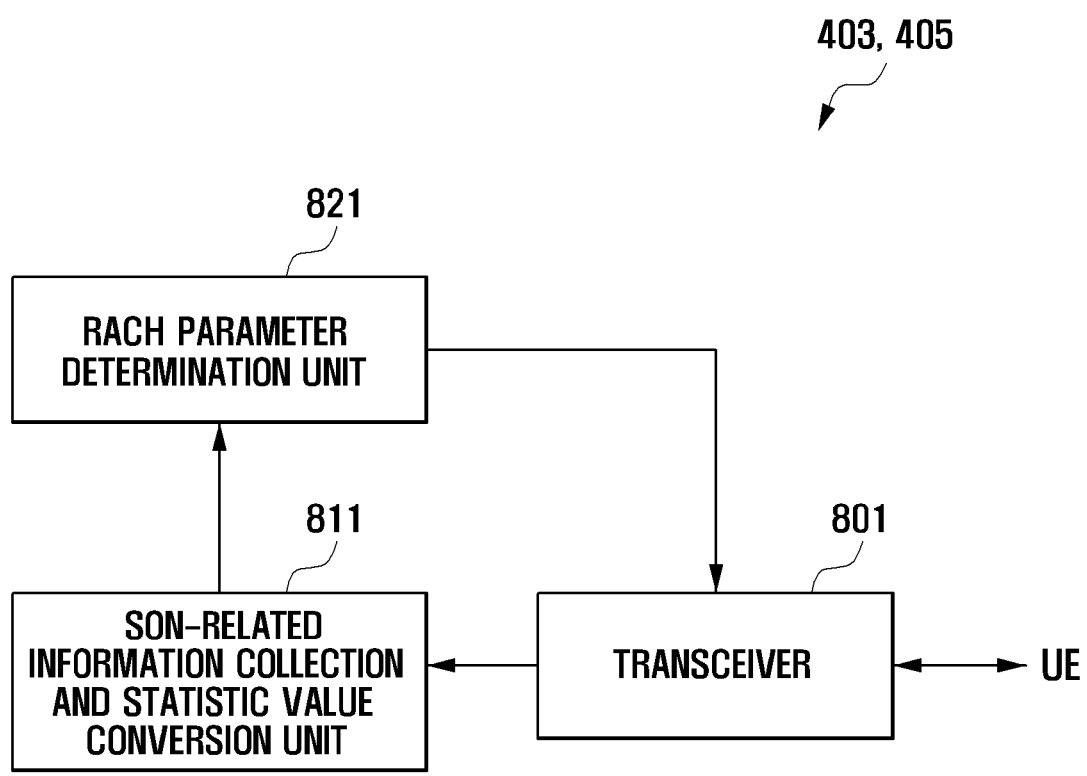
FIG. 8 is a block diagram illustrating a configuration of a network node for supporting the RACH-related system resource optimization method, according to an embodiment of the present invention.

FIG. 8 is a block diagram illustrating a configuration of a network node for supporting the RACH-related system resource optimization method, according to an embodiment of the present invention.

As shown in FIG. 8, the network node includes a transceiver 801, a SON-related information collection and statistical value conversion unit 811, and a RACH parameter determination unit 821.

The transceiver 801 is responsible for communication with the UEs and broadcasting the system information within the cell. The SON-related information collection and statistical value conversion unit 811 collects the information transmitted by the UEs for a predetermined duration and converts the collected information to statistical values. The RACH parameter determination unit 821 determines the RACH-related parameter values (e.g., messageSizeGroupA and messagePowerOffsetGroupB) based on the statistical values. The RACH-related parameter values updated by the RACH-parameter determination unit 821 are transmitted to the UEs by means of the transceiver 801. Although FIG. 8 shows the configuration of an ENB even determining the RACH parameter values, the RACH parameter determination unit 821 can be implemented in a separate SON server. In this case, the transceiver 801 is configured so as to transmit the statistical values to the SON server, and the SON server includes a transceiver for receiving the statistical values transmitted by the ENB and transmits the RACH parameter values to the ENB. In another embodiment of the present invention, the SON server can include the RACH parameter determination unit 821.

As described above, the RACH-related resource optimization method and apparatus of the present invention is capable of optimizing the message size parameter values in adaptation to the change of the network environment due to new cell installation, change of the configuration information of the cells, and new cell installation/network extension.

While the present invention has been shown and described with reference to certain embodiments thereof, it will be understood by those skilled in the art that various changes in form and detail may be made therein without departing from the spirit and scope of the invention as defined by the appended claims.

What is claimed is:

1. A method for receiving information by a terminal in a wireless communication system, the method comprising:
transmitting, to a base station, a request message for a random access including a preamble;
receiving, from the base station, a response message including uplink resource information in response to the request message;
transmitting, to the base station, a first message based on the uplink resource information, the first message including information on an identity of the terminal;
identifying downlink channel information based on the response message and uplink transmission capability information corresponding to the first message; and
transmitting, to the base station, the downlink channel information and the uplink transmission capability information, if an information request message is received from the base station,
wherein the uplink transmission capability information includes at least one of a number of transmission-available bits for available uplink power and an uplink power margin for the specific uplink transmission.

2. The method of claim 1, further comprising receiving, from the base station, information for an uplink message size for the random access,
wherein the information for the uplink message size for random access is determined based on the uplink transmission capability information and the downlink channel information, and
wherein the downlink channel information includes at least one of a path loss between the terminal and the base station and a reference signal received power at the terminal.

3. The method of claim 2, wherein the uplink resource information is determined based on the information for the uplink message size.

4. The method of claim 1, wherein transmitting the downlink channel information and the uplink transmission capability information comprises:
storing, if a second message is received from the base station in response to the first message, the downlink channel information and the uplink transmission capability; and
transmitting, to the base station, the stored downlink channel information and the stored uplink transmission capability information.

5. A method for transmitting information by a base station in a wireless communication system, the method comprising:
receiving, from a terminal, a request message for a random access including a preamble;
transmitting, to the terminal, a response message including uplink resource information in response to the request message;
receiving, from the terminal, a first message based on the uplink resource information, the first message including information on an identity of the terminal; and
receiving, from the base station, downlink channel information identified based on the response message and uplink transmission capability information corresponding to the first message, if an information request message is transmitted to the terminal,
wherein the uplink transmission capability information includes at least one of a number of transmission-available bits for available uplink power and an uplink power margin for the specific uplink transmission.

6. The method of claim 5, further comprising transmitting, to the terminal, information for an uplink message size for the random access,
wherein the information for the uplink message size for random access is determined based on the uplink transmission capability information and the downlink channel information, and
wherein the downlink channel information includes at least one of a path loss between the terminal and the base station and reference signal received power at the terminal.

7. The method of claim 6, wherein uplink resource information is determined based on the information for the uplink message size.

8. The method of claim 5, wherein the downlink channel information and the uplink transmission capability information are stored in the terminal, if a second message in response to the first message is transmitted to the terminal, and
wherein receiving the at least one of the downlink channel information and the uplink transmission capability information comprises receiving, from the terminal, the stored downlink channel information and the stored uplink transmission capability information.

9. An apparatus of a terminal for receiving information in a wireless communication system, the apparatus comprising:
a transceiver configured to transmit and receive a signal; and
a controller coupled to the transceiver and configured to:

transmit, to a base station, a request message for a random access including a preamble, receive, from the base station, a response message including uplink resource information in response to the request message, transmit, to the base station, a first message based on the uplink resource information, the first message including information on an identity of the terminal, identify downlink channel information based on the response message and uplink transmission capability information corresponding to the first message, and transmit, to the base station, the downlink channel information and the uplink transmission capability information, if an information request message is received from the base station, wherein the uplink transmission capability information includes at least one of a number of transmission-available bits for available uplink power and an uplink power margin for the specific uplink transmission.

10. The apparatus of claim 9, wherein the controller is further configured to receive, from the base station, information for an uplink message size for the random access, wherein the information for the uplink message size for random access is determined based on the uplink transmission capability information and the downlink channel information, and wherein the downlink channel information includes at least one of a path loss between the terminal and the base station and a reference signal received power at the terminal.

11. The apparatus of claim 10, wherein the uplink resource information is determined based on the information for the uplink message size.

12. The apparatus of claim 9, wherein the controller is further configured to store, if a second message is received from the base station in response to the first message, the downlink channel information and the uplink transmission capability, and to transmit, to the base station, the stored downlink channel information and the stored uplink transmission capability information.

13. An apparatus of a base station for transmitting information in a wireless communication system, the apparatus comprising:

a transceiver configured to transmit and receive a signal; and a controller coupled to the transceiver and configured to:
receive, from a terminal, a request message for a random access including a preamble, transmit, to the terminal, a response message including uplink resource information in response to the request message, receive, from the terminal, a first message based on the uplink resource information, the first message including information on an identity of the terminal, and receive, from the base station, downlink channel information identified based on the response message and uplink transmission capability information corresponding to the first message, if an information request message is transmitted to the terminal, wherein the uplink transmission capability information includes at least one of a number of transmission-available bits for available uplink power and an uplink power margin for the specific uplink transmission.

14. The apparatus of claim 13, wherein the controller is further configured to transmit, to the terminal, information for an uplink message size for the random access, wherein the information for the uplink message size for random access is determined based on the uplink transmission capability information and the downlink channel information, and wherein the downlink channel information includes at least one of a path loss between the terminal and the base station and reference signal received power at the terminal.

15. The apparatus of claim 14, wherein uplink resource information is determined based on the information for the uplink message size.

16. The apparatus of claim 13, wherein the downlink channel information and the uplink transmission capability information are stored in the terminal, if resolution second message in response to the first message is transmitted to the terminal, and wherein the controller is further configured to receive, from the terminal, the stored downlink channel information and the stored uplink transmission capability information.

* * * * *